United States Patent [19]

Willard

[11] Patent Number: 5,324,589
[45] Date of Patent: Jun. 28, 1994

[54] THERMOFORMABLE, MULTILAYER ABS FILMS AND EQUIPMENT LINERS

[75] Inventor: G. Fred Willard, Parkersburg, W. Va.

[73] Assignee: General Electric Company, Pittsfield, Mass.

[21] Appl. No.: 983,333

[22] Filed: Nov. 30, 1992

[51] Int. Cl.$^5$ .................................................. B32B 27/34
[52] U.S. Cl. ..................................... 428/476.3; 428/332; 428/475.5; 428/500; 428/521
[58] Field of Search .................... 428/476.3, 35.7, 500, 428/475.5, 332; 525/89; 264/26

[56] References Cited

U.S. PATENT DOCUMENTS

| | | | |
|---|---|---|---|
| 4,513,037 | 4/1985 | Collins | 428/35 |
| 4,937,130 | 6/1990 | Clagett et al. | 428/35.7 |
| 5,104,937 | 4/1992 | Saito et al. | 525/89 |
| 5,128,073 | 7/1992 | Allen et al. | 264/26 |
| 5,219,665 | 6/1993 | Chen et al. | 428/35.7 |

*Primary Examiner*—Paul J. Thibodeau
*Assistant Examiner*—David Abraham

[57] ABSTRACT

Multilayer films of ABS resin and amorphous polyamide resin are provided which are thermoformable with the use of an adhesive layer comprising a blend of the amorphous polyamide resin and the ABS resin. The multilayer films exhibit gas barrier properties which allow for the use of these films in environments where blowing agents escape from foamed-in-place insulation. The multilayer films can be thermoformed to provide equipment liners such as refrigerator liners, dishwasher liners, car interior panels, and appliance housings.

14 Claims, No Drawings

THERMOFORMABLE, MULTILAYER ABS FILMS AND EQUIPMENT LINERS

BACKGROUND OF THE INVENTION

The present invention relates to thermoformable, multilayer acrylonitrile-butadiene-styrene (ABS) resin films and equipment liners. More particularly, the present invention relates to thermoformable, multilayer ABS films and thermoformed equipment liners obtained therefrom which are used with foamed-in-place insulation.

Acrylonitrile-butadiene-styrene resins comprise three monomeric building blocks--acrylonitrile, butadiene, and styrene--which allow for variation in properties such as chemical resistance, heat stability, impact resistance, and toughness, rigidity, and processing ease, depending on the percentages of the three major components therein and the additives used. In addition to providing useful properties to the finished products, ABS resins can be easily processed to finished parts such as by coextrusion, sheet extrusion, thermoforming, blow molding, profile extrusion, and injection molding. Because of its versatility, ABS is used in a wide variety of applications, such as equipment liners, in that it provides strong, durable shielding in many environments. Typical equipment liners include automotive interior trim, business machine housings, refrigerator liners, dishwasher liners, and appliance housings. ABS is often the material of choice for its balance of strength, toughness (impact resistance), appearance (gloss and color), chemical resistance, processability, and price. For example, this balance of properties makes ABS extruded sheets the material of choice for thermoformed equipment liners such as the interior food compartments and door liners of refrigerators. Other major end uses of ABS thermoformed extruded sheet include dishwasher liners and interior and exterior parts for trucks, autos, boats, and mobile homes.

ABS provides deep draw capability for thermoforming operations, strength and toughness for durability in assembly and use, high gloss, and chemical resistance to items such as food. Sheet extrusion grades of ABS are produced as low, medium, or high impact resins with various gloss levels ranging from high gloss to matte (low gloss). In many end uses, such as refrigerator liners, the ABS is exposed to foamed-in-place insulation during assembly. Foamed-in-place insulation typically generates a rush of blowing agent so as to foam the material (polyurethane). This rush of blowing agent passes through the conventional ABS layers, causing embrittlement and surface cracks. It is believed that the blowing agents utilized for the foamed-in-place insulation, particularly fluorohydrocarbons, degrade the ABS liner when they penetrate the liner, causing it to crack, despite the chemical resistance and impact resistance of ABS. Methods for improving the resistance of ABS resin to these blowing agents often result in the loss of some advantages of ABS resin. It is desirable to provide an equipment liner based on ABS resin which is more resistant to degradation caused by foamed-in-place insulation which maintains the advantages of ABS resins.

SUMMARY OF THE INVENTION

It is, therefore, an object of the present invention to provide thermoformable films based on acrylonitrile-butadiene-styrene resin which are resistant to degradation from the blowing agents used in foam-in-place insulation.

It is an additional object of the present invention to provide an equipment liner resistant to fluorohydrocarbon blowing agents from foamed-in-place insulation sufficient to maintain a Class A finish.

Upon further study of the specification and appended claims, further objects and advantages of this invention will become apparent to those skilled in the art.

These and other objects are achieved by a thermoformable multilayer film which comprises a layer of ABS resin, a layer of amorphous polyamide resin, and an adhesive layer comprised of a blend of ABS resin and amorphous polyamide resin positioned therebetween. Thermoformed equipment liners obtained from this multilayer film are also provided.

It has been found that the desirable properties of ABS films, such as finish, chemical resistance, and impact resistance, are not lost while the amorphous polyamide layer reduces the exposure of the ABS resin to the blowing agents by slowing down the rate of transmission to the ABS component. Slowing the rate of transmission is adequate, since the exposure to the blowing agents from foamed-in-place insulation is short-lived. These multilayer films are surprisingly thermoformable. It is often difficult to thermoform multilayered films into finished articles because the apparent melt viscosities of the various layers may differ significantly at the extrusion temperatures. In addition, the different layers are often incompatible and separate upon subsequent processing or in use.

DETAILED DESCRIPTION OF THE PREFERRED EMBODIMENTS

A significant advantage provided by the ABS resin layer utilized in this invention is that it is very easy to process by thermoforming, even in large volumes. Most ABS resin grades provide deep draw capability in thermoforming operations. Furthermore, ABS resins are tough and durable once formed into a desired shape; so they are easily machined, bonded, fastened, decorated, or finished by techniques common in use. General purpose ABS grades which are commercially available are particularly suitable for use in the multilayer films of the present invention. Specialty grades, such as low gloss, high gloss, and UV-resistant grades, are also suitable.

Acrylonitrile-butadiene-styrene resins suitable for use in this invention comprise three monomeric building blocks, acrylonitrile, butadiene, and styrene, which can vary widely with respect to the percentage used. The proportion of these components can be tailored to desired needs such as chemical resistance, heat stability, impact resistance, toughness, rigidity, and processing needs. The relative proportion of these components will vary with respect to the desired end use. For example, butadiene provides impact resistance. In providing a refrigerator liner, a larger proportion of butadiene may be utilized to provide low temperature impact resistance. The styrene component may be high so as to enhance processing ease and reduce costs. ABS is not a random terpolymer of acrylonitrile, butadiene, and styrene but a mixture of styrene-acrylonitrile copolymer grafted with butadiene. The butadiene provides a rubber phase which exists as discrete particles. The rubber phase can exist in sizes of from 0.1 $\mu$m to several microns in diameter. The total rubber content typically ranges from 5-30%.

The styrene-acrylonitrile polymer matrix usually contains from about 15-35 wt % acrylonitrile. Higher levels of acrylonitrile are desired to improve strength and resistance to heat and aggressive chemicals. The butadiene portion is typically reduced with increased acrylonitrile portions.

The ABS resins used can contain conventional additives such as plasticizers and/or lubricants which are conventionally used to alter the chemical properties. Other conventional monomers may be added to the ABS resin polymer, as well. For example, methyl methacrylate may be used to adjust the refractive index so as to impart clarity. Other conventional additives may be added to achieve their additive effects such as flame retardancy, UV resistance, and anti-static properties. Reinforced grades can only be used where the reinforcement does not interfere with subsequent thermoforming.

The ABS resin utilized can be made by any of the three conventional manufacturing processes used commercially. These include emulsion polymerization, continuous mass polymerization, and suspension polymerization. Emulsion polymerization provides polymers with both high gloss and high impact resistance. Continuous mass polymerization provides narrow chain length distributions of polymer. Suspension polymerization provides a broad molecular weight distribution that is particularly suitable for thermoformed products.

In an emulsion process, a polybutadiene substrate latex is prepared, generally in emulsion batch reactions, either as a homopolymer or as a copolymer, with up to 35% styrene or acrylonitrile. In the next step, styrene and acrylonitrile are grafted onto the polybutadiene substrate using free radical initiators such as potassium persulfate and chain transfer agents. Concurrent with the graft reaction is the formation of styrene-acrylonitrile copolymer. Emulsion ABS resins are then recovered from latex by coagulation with organic acid solutions.

In contrast to the emulsion process, the suspension process begins with a lightly crosslinked polybutadiene rubber which is soluble in monomers. The polybutadiene must be coated and dried for use in this process. A pre-polymer is made following dissolution of styrene in the rubber and introduction of acrylonitrile to obtain 20-30% conversion after reaction at 80°-120° C. for 6-8 hours. The polymer syrup is dispersed in water in a suspension reactor, chain transfer agents are added, and the reactor is heated to 100°-170° C. In bulk polymerization, a polymer syrup is obtained in a manner similar to suspension polymerization (30% conversion). The syrup is then pumped into a special reactor where conversion is taken to 50-80%.

Examples of suitable, commercially available ABS resins are those provided by General Electric Company under the trade designation CYCOLAC® resin, particularly the general purpose grades, the extrusion grades, and blow molding grades.

The amorphous polyamide resin which is utilized in the present invention preferably exhibits a high glass transition temperature, a low gas transmission rate, and has an apparent melt viscosity suitable for coextrusion with ABS resin. The amorphous polyamides generally have no distinct melting point, and the heat of fusion is about 1 calorie per gram or less, as determined by the use of a differential scanning calorimeter (DSC). The amorphous polyamides of the present invention are obtained from the reaction products of:

(a) an aliphatic diamine having the general formula $H_2N-R^1-NH_2$, wherein $R^1$ is a straight or branched aliphatic hydrocarbon having from 4-8 C atoms, and (b) a phthalic acid composition selected from acids having the general formula

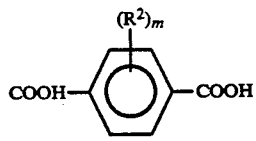

wherein $R^2$ is a substituent group selected from halogens and lower alkyls having from 1-3 C atoms, and m is from 0-4 inclusive.

As amorphous polyamides, these resins exhibit low levels of crystallinity. Crystallinity is not an absolute but a relative characteristic of a polymer. The degree of crystallinity varies from 0-100%, as determined by analytical techniques such as X-ray diffraction or differential scanning calorimetry (DSC). The X-ray diffraction patterns of crystalline materials are well defined, whereas the diffraction patterns of amorphous materials are random. To determine the degree of crystallinity, patterns of a particular sample are compared to those of a standard having a known degree of crystallinity. A standard sample is also used in DSC analysis. For DSC analysis, a sample is heated and the temperature monitored. A crystallization transition and/or crystalline melting transition in temperature is observed upon heating the crystalline material. A completely amorphous material will have no crystallization or crystalline melting transition, i.e., no definite melting point. A highly crystalline polymer will have a well-defined crystalline melting temperature. The degree of crystallinity of a sample is determined by comparing the area of its melting transition peak, i.e., the heat of fusion necessary to melt the sample, with the area of a sample having a known degree of crystallinity. The amorphous polyamides utilized in this invention typically have a heat of fusion of less than 1 calorie per gram, as determined by DSC. The amorphous polyamide polymers may have a degree of crystallinity as high as 5% or more. High levels of crystallinity within the sample are obtained from molecular symmetry, hydrogen bonding, and a linearity within the polymers. Portions of a polymer exhibit these characteristics and provide islands of crystallinity. It is within the skill of a person knowledgeable in the art to avoid symmetry and linearity when producing polyamides simply by utilizing a variety of monomers. Branched chain monomer segments can be used instead of those having linear segments, and hydrogen bonding can be avoided to some degree by utilizing aromatic groups. Side chain substitutions on the polymer backbone, such as the use of a methyl group to disrupt regularity in hydrogen bonding, may be employed. Odd chain diamines, diacids, and metaaromatic substitution may also prevent crystallization. Symmetry may also be disrupted through copolymerization by using more than one diamine, diacid, or monoamino monocarboxylic acid to disrupt regularity. In the case of copolymers, those monomers which normally are polymerized to produce crystalline homopolymers, such as Nylon 6, Nylon 6/6, Nylon 11, Nylon 12; Nylon 6/3; Nylon 6/4; Nylon 6/10; or Nylon 6/12, may be copolymerized to produce random amorphous copolymers.

Examples of amorphous polyamides contemplated to be useful in this invention include, but are not limited to, those having repeating units of the formula selected from the group consisting of

—NH—R¹—NH—CO—R²—CO— ti and
ti —NH—R¹—CO—NH—R²—CO—
wherein R¹ and R² are different divalent organic radicals selected from the group consisting of $C_{2-15}$-alkylene radicals, $C_{3-18}$-cycloalkylene radicals, and $C_{6-20}$-arylene radicals. Mixed alkylene-cycloalkylene or alkylene-arylene-cycloalkylene radicals of $C_{4-30}$ are also considered to be within the scope of the terms "cycloalkylene" and "arylene".

These amorphous polyamides may be prepared by polymerization of diamines having the formula

with dicarbonyl compounds, such as dicarboxylic acids, esters, or chlorides of the formula

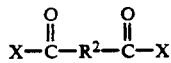

wherein X is chlorine, hydroxy, $C_{1-3}$-alkoxy, or $C_{6-20}$-aryloxy, and R¹ and R² are as defined above.

Typically, equimolar portions of the diamine and dicarboxylic acid are utilized. Slight departures from the equimolar proportions can be tolerated. Examples of suitable diamines include trimethylene diamine; tetramethylene diamine; pentamethylene diamine; hexamethylene diamine; octamethylene diamine; isomeric trimethyl-hexamethylene diamine; 2,2-bis(p-aminocyclohexyl)propane; bis(4-aminocyclohexyl)methane; bis(4-amino-3-methylcyclohexyl)methane; bis(4-aminophenyl)methane; meta-phenylene diamine; para-phenylene diamine; meta-xylene diamine, terexylene diamine; and the like.

Suitable carboxylic acids/esters include sebacic acid, suberic acid, glutaric acid, pimelac acid, adipic acid, octadecanedoic acid, terephthalic acid, isophthalic acid, and azelaic acid.

Preferred combinations of acid and amine include terephthalic acid with trimethyl-hexamethylene diamine; isophthalic acid with trimethyl-hexamethylene diamine; adipic acid plus azelaic acid with 2,2-bis(p-aminocyclohexyl)propane; terephthalic acid with bis(4-aminocyclohexyl)methane; isophthalic acid with hexamethylene diamine and terephthalic acid; isophthalic acid with hexamethylene diamine; and combinations thereof.

An alternative method for preparing the amorphous polyamides utilized in this invention is to polymerize two different monoamino-monocarbonyl compounds of each formula below:

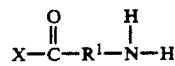 (III)

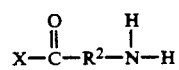 (IV)

wherein X, R¹ and R² are as defined above. Lactam structures for these monoamine-monocarboxylic acids may also be utilized, either alone or with the monoamine-monocarboxylic acids. The lactam structures are ring structures formed by self-reaction of the amine and acid groups. Examples of these monoamine-monocarboxylic acids and their lactams include aminocaproic acid, butyrolactam, pivalolactam, caprolactam, capryllactam, enantholactam, undecanolactam, dodecanolactam, 3-aminobenzilic acid, and 4aminobenzylic acid. Mixtures of the lactams with diamines dicarboxylic acids (and their derivatives) will also produce amorphous polyamides suitable for this invention. Mixtures, random copolymers, or block copolymers of two or more of the amorphous polyamides are also within the scope of this invention, as are blends of crystalline and amorphous polyamides.

Preferably, the phthalic acid is selected from isophthalic acid, terephthalic acid, and mixtures thereof. The term "phthalic acid" is to include reactive derivatives thereof such as phthaloyl halides, including terephthaloyl chloride and isophthoyl chloride. The polyamide resin can be obtained by reacting substantially equal amounts of the diamine and phthalic acid component. The phthalic acid component preferably comprises from 0-35 wt % terephthalic acid and from 100-65 wt % isophthalic acid. Most preferably, the ratio of isophthalic acid to terephthalic acid is 65:35.

For the amorphous polyamides to be suitable as a layer in the multilayer film of the present invention, the amorphous polyamide resin should have an apparent melt viscosity somewhat similar to the apparent melt viscosity of the ABS resin at the extrusion temperature. Preferably, the amorphous polyamide resin has an apparent melt viscosity sufficiently high to permit coextrusion with the ABS resins, has a glass transition temperature of at least 105° C. to permit shape retention during hot filling, and has a gas transmission rate (oxygen transmission rate) of at most 2.0 cc/mil per 100 square inches per day per atmosphere.

Particular examples of amorphous polyamides suitable for use in this invention include, but are not limited to:

PACP-9/6, which is a 50:50 mole ratio copolymer of 2,2'-bis(4-aminocyclohexyl)propane and a 60/40 wt % mixture of azelaic acid and adipic acid. A more detailed description of the preparation of this polymer is found in U.S. Pat. No. 3,840,501, which is incorporated herein by reference.

Zytel ® 330 and Selar PA, which are amorphous polyamides derived from hexamethylene diamine and mixtures of terephthalic acid and isothalic acid. These amorphous polyamides are available from E.I duPont.

Grilamid ® TR 55, which is an amorphous polyamide derived from isophthalic acid/bis(4-amino-3-methylcyclohexyl)methane/lauryl lactam and is available from Emser Industries.

Trogamid ® T, which is derived from dimethyl terephthalate and a mixture of 2,2,4- and 2,4,4-trimethylhexamethylene diamine and is available from Dynamit Nobel.

The multilayer films and equipment liners of the present invention incorporate an adhesive layer between the amorphous polyamide and the ABS resin to prevent separation following thermoforming. An important feature of the present invention is the use of a blend of amorphous polyamide and ABS resin as the adhesive layer. This blend can be obtained by mixing the two components with conventional equipment, or, in the alternative, the blend may be provided by a regrind of scrap obtained during coextrusion or thermoforming of the film in producing products. Furthermore, the blend may be a combination of regrind and additional virgin amorphous polyamide and/or ABS resin so as to obtain desired properties of the adhesive layer. The use of regrind blends of amorphous polyamide and ABS resin avoids waste of scrap during coextrusion and thermoforming. The regrind layer also provides some gas barrier properties to aid the performance of the polyamide layer. The proportion of ABS resin to amorphous polyamide used in the adhesive layer can range from 2-20:1 for ABS:polyamide and is more preferably within the range of 5-10:1 and typically about 9:1. The proportion of isophthalic acid to terephthalic acid within the amorphous polyamide is about 67:33 for these blends.

The adhesive layer of ABS resin blended with amorphous polyamide resin may have a conventional compatibilizer incorporated therein. The presence of the adhesive layers reduces the limitations on the draw, consistent with the use of different layers. The compatibilizer is used to compensate for differences in the glass transition temperature between the polyamide and the ABS resin.

The three layers which form the films and equipment liners of the present invention can be coextruded into a single sheet utilizing conventional equipment. An alternative is to extrude separate films of the amorphous polyamide and ABS resin and then adhere the two sheets with the adhesive layer by conventional techniques.

The multilayer films and equipment liners of the present invention can vary widely in thickness and in proportion of the amorphous polyamide, ABS resin, and blend layer. The minimum thickness of the film is determined by the strength, stiffness, rigidity, and integrity necessary in the finished article. Generally, the minimum thickness is about 10 mils and preferably about 20 mils. The maximum combined thickness of the layers forming the film and equipment liners is not critical but is governed by such secondary considerations as appearance, cost, weight, and the like. One illustration of the liners formed with the three-layer structure of the present invention may have a combined wall thickness of from about 20-70 mils.

The minimum thickness of the amorphous nylon layers is such that the layer functions as an effective gas barrier, i.e., exhibits substantial gas barrier properties to the blowing agents used in foamed-in-place insulation. This thickness depends to a certain degree upon the particular polyamide resin utilized. Generally, however, this minimum thickness is about 0.5 mils and is preferably about 1 mil to allow for easy processing. The upper thickness range for the amorphous polyamide layer is not critical but is controlled by such secondary considerations as cost, appearance, fabrication, and product weight. As a non-limiting illustration, multilayer films and equipment liners of the present invention typically have an amorphous polyamide layer of from 1-10 mils and more typically 1-2 mils.

The adhesive layer can be of minimal thickness, i.e., a thickness of 0.5 mils is adequate. The upper thickness of this range is not critical but is typically controlled by available regrind, ease of fabrication, cost, and other secondary considerations. As a non-limiting illustration, the multilayer films and equipment liners of the present invention typically incorporate an adhesive layer of from 1-20 mils, more typically from 1-2 mils.

The minimum thickness of the ABS resin is determined by the end use of the film or equipment liner. As a non-limiting illustration, typical films and equipment liners utilize at least 2 mils of ABS resin and preferably about 5 mils. This minimum thickness is primarily determined by secondary considerations such as ease of fabrication. The cost of the ABS resin favors the use of this layer as the primary component of the films and equipment liners of the present invention. The upper thickness of this range for the ABS resin layers is not critical but is controlled by secondary factors such as weight of the finished product, appearance, and ease of fabrication. Costs can become a factor where no advantage is obtained. In general, the ABS resin layer ranges in thickness from about 1-50 mils and is typically from about 2-20 mils.

The multilayer film of the present invention has gas barrier properties at least five times greater than a layer of ABS resin of equivalent thickness. The superior barrier properties reduce the transmission of gases therethrough such as the blowing agents of foamed-in-place insulation. Such multilayer films are resistant to surface defects caused by the transmission of blowing agents therethrough and allows these films to be used as an insulated equipment liner.

The blowing agents which are utilized in foamed-in-place insulation are volatile liquids or gases which can be absorbed into the polymer composition and will vaporize at temperatures below the Tg of the resin matrix. Blowing agents of foamed-in-place insulation may include conventional hydrocarbon or fluorocarbon blowing agents. Conventional hydrocarbon blowing agents include aliphatic hydrocarbons such as propane, butane, isobutane, n-pentane, isopentane, neopentane, pentene, cyclopentane, hexane, heptane, octane, mixtures thereof, and the like. Conventional fluorocarbon blowing agents include trichlorofluoromethane (Freon® 11), dichlorodifluoromethane (Freon® 12), and difluorochloromethane (Formacell® S and Freon® 14). Other halogenated hydrocarbon blowing agents include methylene chloride, chloroform, carbon tetrachloride, and HCFC's, such as dichlorotrifluoroethane (HCFC-123), chlorotetrafluoroethane (HCFC-124), tetrafluoroethane (HFC-134A), dichlorofluoroethane (HCFC-141B), chlorodifluoroethane (HCFC-142B), and difluoroethane (HFC-152A). The matrix of the foamed-in-place insulation can be any thermoplastic with a low Tg that combines with a blowing agent and is typically polyurethane.

The multilayer films of the present invention can be thermoformed utilizing conventional equipment. There are numerous types of equipment which provide for thermoforming by various techniques such as vacuum forming, mechanical drawing, and the like. The multilayer films of this invention can be thermoformed to provide equipment liners such as refrigerator liners, dishwasher liners, and panels for automotive interiors.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

The entire disclosure of all applications, patents, and publications, cited herein, are hereby incorporated by reference.

We claim:

1. A thermoformable, multilayer film consisting essentially of a layer consisting essentially of acrylonitrile-butadiene-styrene (ABS) resin, a layer consisting essentially of amorphous polyamide resin, and an adhesive layer therebetween consisting essentially of a blend of said amorphous polyamide resin and said ABS resin whereby said multilayer film consist essentially of said ABS resin and said amorphous polyamide resin, said adhesive layer being provided for adhesion between the amorphous polyamide layer and the ABS resin layer, wherein said multilayer film is thermoformable without separation or tearing of layers.

2. A thermoformable, multilayer film as in claim 1, with gas barrier properties at least five times greater than a layer of ABS resin of equivalent thickness.

3. A thermoformable, multilayer film as in claim 1, which is thermoformed into a three-dimensional shape without separation of layers.

4. A thermoformable, multilayer film as in claim 3, which is an equipment liner for use with foamed-in-place insulation.

5. A thermoformable, multilayer film as in claim 3, which is an equipment liner for use with polyurethane foamed-in-place insulation having a blowing agent selected from the group consisting of dichlorotrifluoroethane, chlorotetrafluoroethane, tetrafluoroethane, dichlorofluoroethane, chlorodifluoroethane, difluoroethane, dichlorodifluoromethane, difluorochloroethane, and dichlorotetrafluoroethane.

6. A thermoformable, multilayer film as in claim 1, wherein the blend ratio of ABS:amorphous polyamide in the adhesive layer is 2-20:1.

7. A thermoformable, multilayer film as in claim 1, wherein the blend ratio of ABS resin:amorphous polyamide resin in the adhesive layer is 5-10:1.

8. A thermoformable, multilayer film as in claim 1, wherein the layers are coextruded, and the ABS resin layer is 2-40 mils thick, the adhesive layer is 1-20 mils thick, and amorphous polyamide layer is 1-10 mils thick.

9. A thermoformable, multilayer film as in claim 1, wherein the amorphous polyamide resin is derived from the reaction products of hexamethylene diamine and a phthalic acid composition comprised of isophthalic acid and terephthalic acid.

10. A thermoformable, multilayer film as in claim 1, comprising more than one ABS resin layer.

11. A thermoformable, multilayer film as in claim 1, comprising more than one amorphous polyamide layer and more than one adhesive layer.

12. An equipment liner comprising a thermoformed, multilayer film as in claim 1.

13. An equipment liner for use with foamed-in-place insulation comprising a thermoformed multilayer film of an acrylonitrile-butadiene-styrene (ABS) resin layer, an amorphous polyamide resin layer and an adhesive layer therebetween consisting essentially of a blend of said amorphous polyamide resin and said ABS resin which provides adhesion between the amorphous polyamide layer and the ABS resin layer.

14. An equipment liner as in claim 13, having gas barrier properties for blowing agents of foamed-in-place insulation, wherein said blowing agent is selected from the group consisting of dichlorotrifluoroethane, chlorotetrafluoroethane, tetrafluoroethane, dichlorofluoroethane, chlorodifluoroethane, difluoroethane, dichlorodifluoromethane, difluorochloroethane, and dichlorotetrafluoroethane.

* * * * *